UNITED STATES PATENT OFFICE.

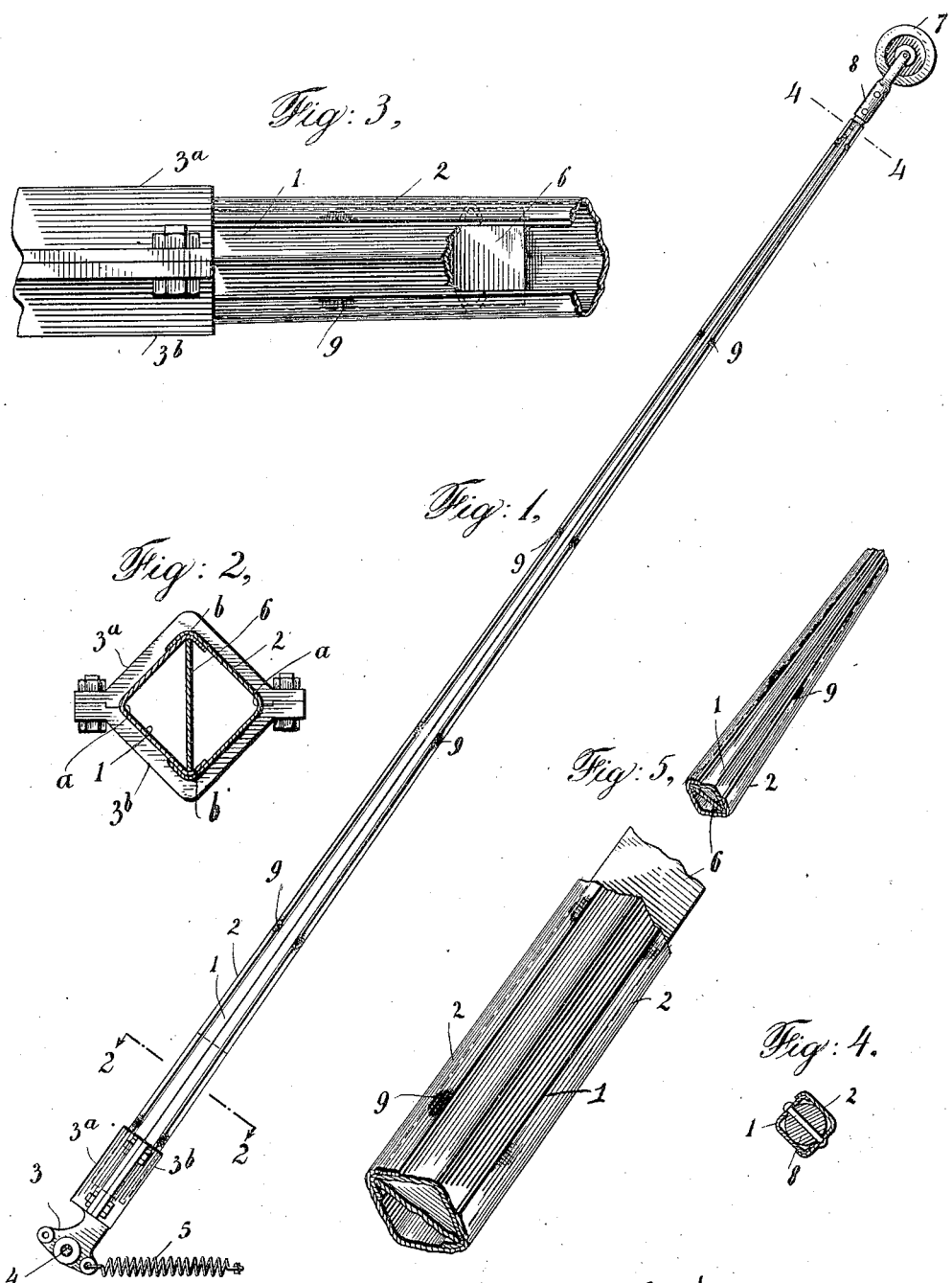

WILFRED L. WRIGHT, OF PHILADELPHIA, PENNSYLVANIA.

TROLLEY-POLE.

1,036,402.

Specification of Letters Patent.

Patented Aug. 20, 1912.

Application filed January 19, 1909. Serial No. 473,129.

*To all whom it may concern:*

Be it known that I, WILFRED L. WRIGHT, a citizen of the United States, residing at Philadelphia, Pennsylvania, have invented certain new and useful Improvements in Trolley-Poles, of which the following is a full, true, and complete specification.

The invention relates to the construction of trolley poles, and seeks to reduce their cost and improve their general efficiency and utility, by constructing them of sheet metal blanks formed and united in the manner hereinafter described, whereby the weight of the pole as a whole and the strength and massiveness of the springs and other supporting parts may be materially diminished, and particularly whereby a certain greater facility is obtained for the pole in following and accommodating itself to curves and lateral displacements of the trolley wire, thereby in great measure preventing or avoiding derailment of the trolley wheel. Facility of assemblage with the trolley wheels and installing on the supporting trolley base are also among the objects of the invention, all of which will be apparent to those familiar with this art, from the drawings and the following description.

Referring to the drawings, Figure 1 represents in side elevation a trolley pole embodying this invention; Fig. 2 is an enlarged cross-section of Fig. 1 on the line 2—2; Fig. 3 is an enlarged side view of the base portion, with parts broken out; Fig. 4 is a cross-section of Fig. 1 on the line 4—4; and Fig. 5 is a perspective view, illustrating a modified form.

The new trolley pole comprises two main sections, 1 and 2, formed of sheet metal blanks, longitudinally bent or flanged so that they may be nested together, forming a hollow shaft, and held against lateral separation by reason of their special interlocking configuration, although it is within the invention to unite the said sections by other means, if desired. Specifically, the sections 1 and 2 are made of similarly tapered sheet-metal blanks, each creased or folded along its central longitudinal axis, as indicated at *a* in the section shown by Fig. 2, and also folded or bent inwardly along its marginal portions, as shown at *b* in the same figure. One of the blanks or sections thus formed is wedged longitudinally within the other, with the flanged or bent marginal portions *b* of one fitting snugly into the interior angle of the corresponding marginal portions of the other, or outer, section, so that the parts are thus securely interlocked and together form a tapered hollow shaft of angular, or more particularly quadrilateral, cross-section, and wherein the overlapping portions of the two sections form a lap-joint embracing the opposite corners of the shaft. If the blanks are bent and flanged at right angles, the shaft will be substantially square in cross-section, which form is preferred. The base or larger end of the tapered shaft as thus formed is held within a socket 3, which is pivotally mounted on the axis 4, and upwardly spring-pressed by the spring 5, according to the usual method of mounting trolley-poles. The interior of the socket is formed to fit the square or other angular formation of the shaft, being preferably slightly tapered, corresponding to the taper of the shaft, and the socket is also longitudinally split or divided into sections, 3ª and 3ᵇ, so that it can be clamped securely upon the base of the shaft, and thus positively hold the latter from turning on its axis or pulling out of the socket. The disposition of the socket is such that the square or quadrilateral shaft will normally be held with one of its diagonals in a vertical plane, and preferably that diagonal is thus disposed which intersects the opposite lap-joints or overlapping marginal portions *b* of the two sections, so that the shaft will contain the greatest amount of metal in its vertical plane, and hence be most rigid against flexure in that direction. This rigidity may be further increased by inserting within the interior of the shaft, a suitable reinforcing member, such as the cross-plate, shown at 6, which is tapered corresponding to the taper of the shaft and wedged into the same, in a diagonal relation, so that it spaces and supports the overlapped portions of the two sections, as shown in Fig. 2. The cross-plate serves two special purposes, one of preventing the clamping pressure of the socket from distorting or crushing the hollow base of the shaft, for which purpose it need be only of coextensive length with the socket; and the other, of stiffening the shaft in a vertical direction and preventing buckling thereof from accidental causes, for which purpose it may extend as far as desired toward the small end of the shaft. As shown in Figs. 1 and 3, it extends only a short distance beyond the socket for stiffening the lower part of the shaft, which arrangement is preferred, but in the modified form shown in Fig. 5, it extends the full length of the shaft. The cross-plate is held in place laterally by its engagement with the interior corners of the shaft, and endwise by the bottom of the socket or by the clamping pressure of the latter, but additional means for this purpose may be provided, if desired. The trolley wheel 7 is journaled as usual in a harp 8, which is mounted in the small end of the shaft by means of its tang or shank inserted in the tubular end thereof and riveted in place, as shown by Figs. 1 and 4, the plane of the trolley wheel being normally coincident or substantially parallel with the vertical plane of the lap-joints. In mounting the pole on the trolley base, its angular engagement with the socket insures proper alinement of the wheel with the axis of the car.

The shaft of the pole constructed as above, may possess more torsional flexibility than is necessary or desirable, depending on the nature of the material from which the sections are made, and the invention includes the regulation of such flexibility or adjustment thereof by firmly or rigidly uniting the overlapping marginal portions of the sections at several intervals along their length, according to the degree of torsional rigidity required—a greater number of points of attachment producing a more rigid torsional effect, and vice versa. The attachment may be made in various ways, but it is preferred to weld or braze the overlapping corner flanges together, as indicated by the shaded spots 9 in Figs. 1 and 5, the area of each weld being about two inches square. For poles made from sheet metal of from twelve to sixteen U. S. gage and say thirteen or fifteen feet long, six of such brazed or welded spots on both sides of the shaft will ordinarily be sufficient. The combination of vertical, lateral and torsional flexibility occurring in poles thus constructed specially adapts them to follow curves and displacements of the trolley wire under all conditions and maintains the trolley wheel in firm and continuous contact with the wire.

I claim the following:

1. A trolley pole comprising two sheet-metal sections forming a hollow shaft and having their longitudinal marginal portions bent into overlapping relation the one upon the other, on opposite sides of said shaft, in combination with a supporting socket receiving the base of said shaft and functioned to hold the said opposite overlapping portions in a vertical plane, and a trolley wheel on the free end of said shaft also held in substantially the same plane.

2. A trolley pole, comprising two sheet-metal sections bent or folded on longitudinal lines and united to form a hollow shaft substantially square in cross-section, in combination with a trolley wheel on one end of said shaft, secured thereto in the plane of one of the diagonals of said square and a base socket for the other end of said shaft adapted to support the same with said plane in a substantially vertical position.

3. A trolley pole comprising two sheet-metal sections together forming a hollow shaft and having their longitudinal marginal portions disposed in overlapping relation and holding said sections against lateral separation, a cross-plate disposed within said shaft spacing the interior overlapped portions thereof, and a trolley wheel supported at the end of said shaft, in the plane of said cross plate.

4. In a trolley pole, two sheet-metal sections longitudinally united to form a hollow shaft, an upwardly spring-pressed supporting socket therefor receiving the base portion of said hollow shaft and a vertically disposed cross-plate fitting the interior of said base portion co-extensively with said supporting socket.

5. A trolley pole comprising longitudinally bent and tapered sheet-metal sections wedged longitudinally the one within the other and forming a hollow shaft, with overlapping longitudinal portions disposed on diametrically opposite sides, a socket receiving the base of said pole and holding the same with said overlapping portions in a substantially vertical plane and a trolley wheel mounted on the free end of said shaft, in the same plane.

6. A trolley pole comprising longitudinally bent and tapered sheet-metal sections wedged longitudinally, one within the other, and forming a hollow shaft of quadrilateral cross-section, in combination with a vertical, tapered cross-plate wedged into the base of said hollow shaft in a diagonal relation therein and a supporting socket clamped upon said base, and a trolley wheel in the plane of said cross plate.

7. A trolley pole comprising two tapered and longitudinally flanged sheet-metal sections, wedged longitudinally the one within the other to form a tapered, hollow shaft, substantially square in cross-section, the overlapping longitudinal portions of said sections forming the opposite corners thereof, a two part clamp-socket holding the larger end of said shaft and a trolley wheel mounted on the smaller end thereof, in substantially the plane of the said opposite corners.

8. A trolley pole comprising longitudinally bent and tapered sheet-metal sections wedged longitudinally, one within the other and forming a tapered hollow shaft of quadrilateral cross-section, the overlapping longitudinal portions of said sections forming lap-joints on the opposite corners thereof and holding the sections together, the said sections being further rigidly united at intervals along the length of said shaft, in combination with a trolley wheel secured to said shaft in substantially the plane of said opposite corners.

In testimony whereof, I have signed my name to the specification in the presence of two subscribing witnesses.

WILFRED L. WRIGHT.

Witnesses:
J. EDGAR WILKINSON,
L. EUGENE KYSE.